Oct. 16, 1923.

G. REMNSNIDER

STENCIL CUTTING MACHINE

Filed Oct. 27, 1921

INVENTOR
GEO. REMNSNIDER
BY
E. E. Huffman
ATTORNEY

Oct. 16, 1923. 1,471,204
G. REMNSNIDER
STENCIL CUTTING MACHINE
Filed Oct. 27, 1921 8 Sheets-Sheet 2

Fig.2.

INVENTOR
GEO. REMNSNIDER
BY
ATTORNEY

Oct. 16, 1923.

G. REMNSNIDER

STENCIL CUTTING MACHINE

Filed Oct. 27, 1921  8 Sheets-Sheet 5

INVENTOR
GEO. REMNSNIDER
BY
E.E.Huffman
ATTORNEY

Oct. 16, 1923.

G. REMNSNIDER

STENCIL CUTTING MACHINE

Filed Oct. 27, 1921   8 Sheets-Sheet 7

1,471,204

INVENTOR
GEO. REMNSNIDER
BY
ATTORNEY

Oct. 16, 1923.

G. REMNSNIDER 1,471,204

STENCIL CUTTING MACHINE

Filed Oct. 27, 1921

INVENTOR
GEO. REMNSNIDER

BY *E. E. Huffman*

ATTORNEY

Patented Oct. 16, 1923.

1,471,204

UNITED STATES PATENT OFFICE.

GEORGE REMNSNIDER, OF BELLEVILLE, ILLINOIS.

STENCIL-CUTTING MACHINE.

Application filed October 27, 1921. Serial No. 510,712.

*To all whom it may concern:*

Be it known that I, GEORGE REMNSNIDER, a citizen of the United States of America, residing at Belleville, county of St. Clair, State of Illinois, have invented a certain new and useful Stencil-Cutting Machine, of which the following is such a full, clear, and exact description, as will enable any one skilled in the art to which it appertains to make and use the same, reference being had to the accompanying drawings, forming part of this specification.

My invention relates to stencil machines and particularly improvements on the form of machines shown in prior Patents No. 1,164,750 granted to me December 21, 1915, and No. 1,131,956 granted to me March 16, 1915. The object of my invention is to improve the construction of machines of the class above referred to and particularly to improve the mechanism for actuating the punches and feeding the stencil sheet.

In the accompanying drawings which illustrate one form of machine made in accordance with my invention.

1 indicates the casting forming the base of the machine and carrying a vertical central stud 2. Mounted to revolve on the stud 2 is a hub member 3. Carried by the hub member 3 is an annular member 4 on which the dies 5 are mounted. 6 are screws securing to the hub member 3 a spider 7 and a hand wheel 8. Mounted in the spider 7 are the punch stems 9. These punch stems 9 are normally held in a raised position by means of coil springs 10 and each punch is connected with one of the adjacent punches by a guide member 11 which thus prevents the punch from rotating and secures its proper alignment with the corresponding die 5. Rigidly mounted to the upper end of the hub member 3 is a beveled gear wheel 12 meshing with a beveled gear wheel 13 mounted on the shaft 14. The shaft 14 passes through a sleeve 15 mounted in the bracket 16 rigidly secured to the upper end of the shaft 2. The sleeve 15 carries cylindrical index plate 17 which is supplied with characters corresponding with the punches and dies. The hand or pointer 18 is rigidly secured to the shaft 14 and indicates upon the disc 17 the character which will be cut when the machine is operated. It will be understood, of course, that the proper character is brought into operative position before rotating the hub 3 through the hand wheel 8. The punches are covered by means of a casing 19 secured to the base 1 by screws 20.

Figure 6:
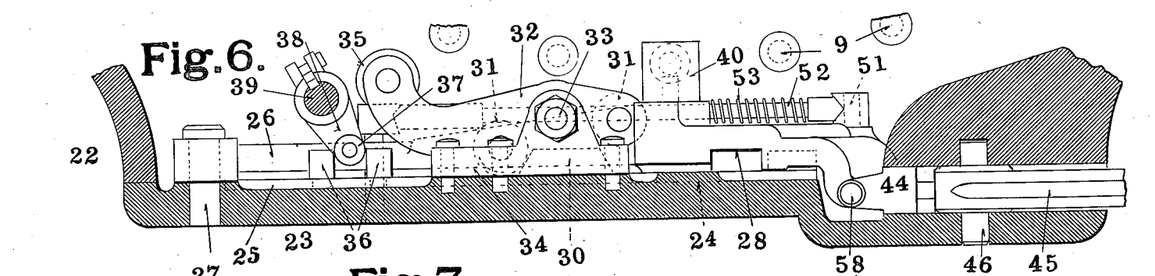
Figure 6 is a section taken on the line 6—6 of Figure 7.
Figure 7:
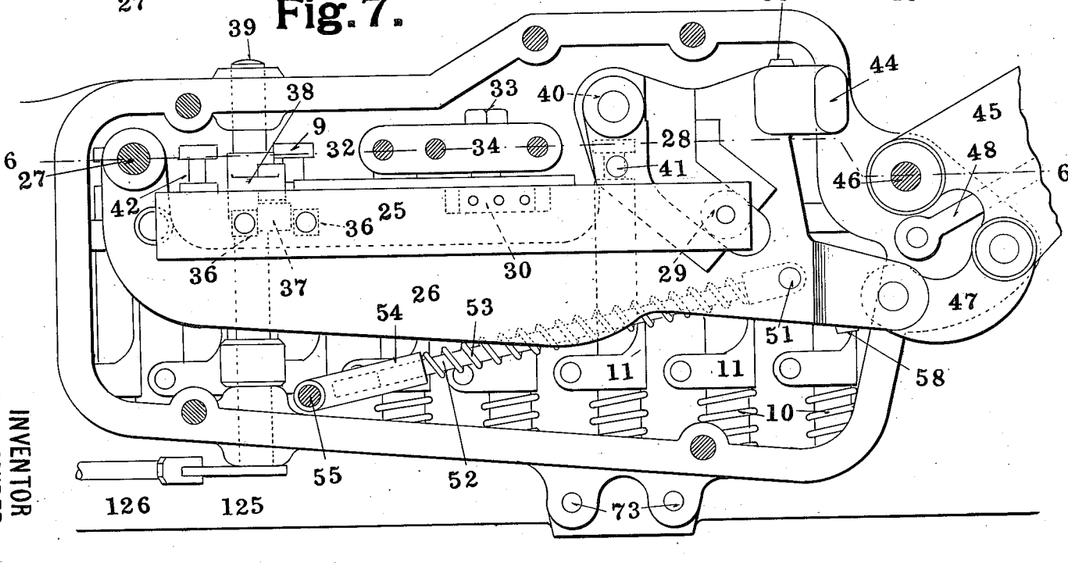
Figure 7 is an enlarged front view of the punch operating mechanism.
Figures 11, 12, 13, 14, 15:
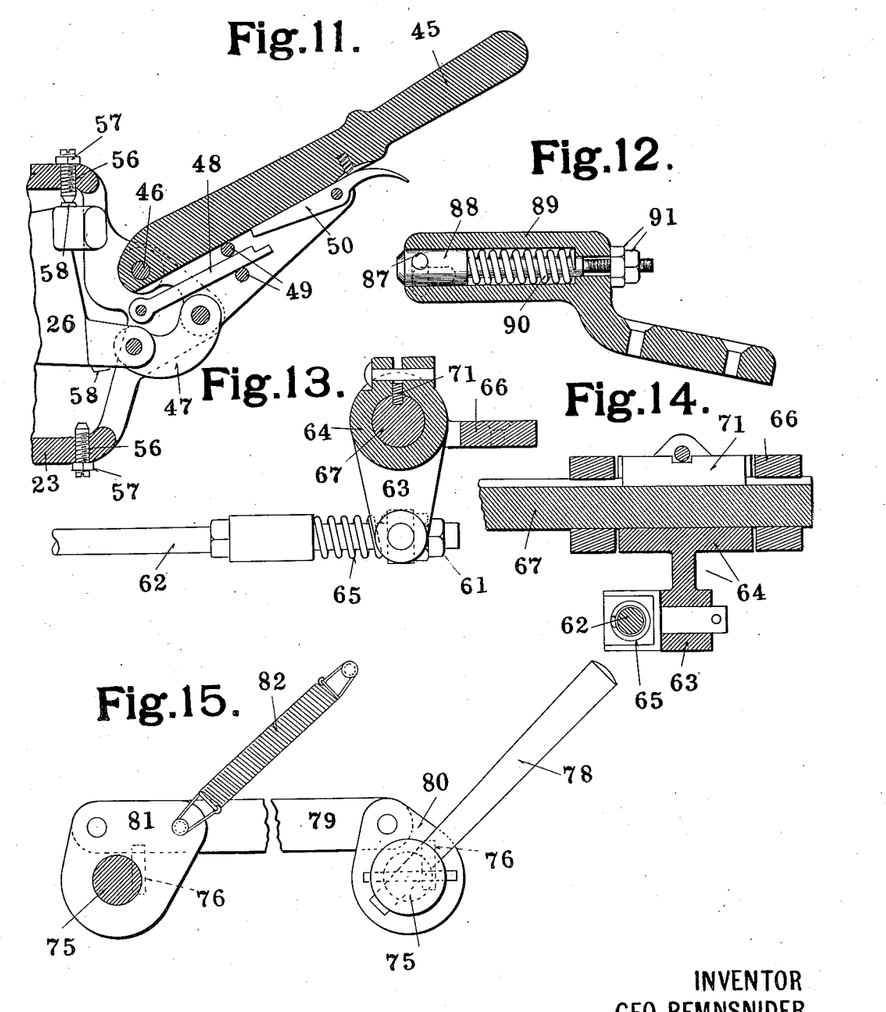
Figure 11 is a detail view, partly in section showing the handle and some of the adjacent parts.
Figure 12 is an enlarged sectional view of the stop for the carriage.
Figures 13 and 14 are enlarged sectional views showing details of part of the connections between the handle and feed carriage.

The front part of the casing 19 is provided with an enlarged portion 22 to receive the mechanism for operating the punches and this enlarged portion is provided with a removable cover plate 23. Referring particularly to Figures 6 and 7, the cover plate 23 is provided in its inner face with a guide way 24 to receive a sliding bar 25 which bar is held in position by means of a lever 26 pivoted at 27 to the cover plate 23, the lever 26 is provided with a cam slot 28 engaging with a cylindrical projection 29 on the bar 25 so that when the lever is moved upon its pivot as will be hereinafter described, the bar 25 will be moved toward the left hand side of the machine in the guide way 24. Secured to the bar 25 is a cam 30 having both ends inclined as best shown in Figure 6. These inclined ends cooperate with anti-friction rolls 31 carried by a lever 32 pivoted at 33 to a bracket 34 carried by the cover plate 23. The lever 32 is also provided with a roll 35 adapted to be moved between two of the punch stems 9 so as to hold the punch carrying lever against rotation while the punches are operated to cut the stencil. The sliding bar 25 also carries a pair of locks 36 between which is situated an anti-friction roll 37 carried on the arm 38 mounted on a vertical shaft 39 which shaft is adapted to communicate motion to the stencil feeding mechanism as will be hereinafter pointed out. Carried by the lever 26 is a cylindrical projection 40 adapted to bear upon the top of one of the punch stems 9 in order to actuate the punch when the lever is moved downwardly by the handle. The said lever is also provided below the projection 40 with a pin 41 adapted to engage with a groove 42 in the punch stem to positively return the punch to its raised position after it has been pressed. The right hand end of the lever 26 is provided with an off-set portion 44 having a pair of guide faces bearing against the face of the casing and the cover plate so as to prevent the lever from moving laterally. 45 is a handle pivoted at 46 between the casing and cover plate and connected to the lever 26 by means of a link 47. 48 is a stop member pivoted to the casing and projecting between a pair of webs carried by the handle 45. These webs also carry a pair of pins 49 forming guides for the stop member 48. This stop member is adapted to cooperate with the end of a pivoted finger piece 50 (Fig. 11) also carried between the webs of the handle so that when the said finger piece is operated, the downward movement of the handle will be arrested to provide a short stroke for feeding the stencil sheet without causing the punch to descend a sufficient distance to perforate the stencil sheet. Normally the movement of the lever 26 is limited by a pair of set screws 56 carried in the cover plates 23 and provided with lock nuts 57. These set screws cooperate with contact faces 58 on the upper and lower edge of the right hand end of the line 26, as best shown in Fig. 11.

Figure 3:
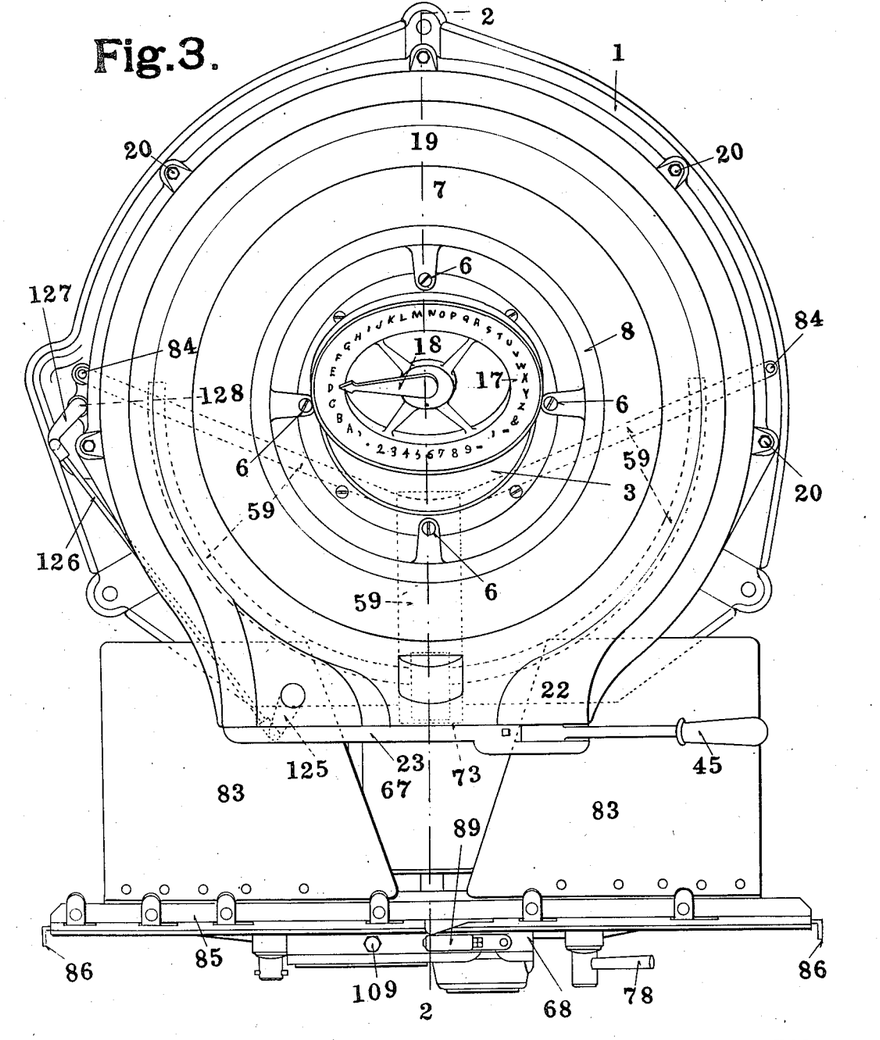
Figure 3 is a top plan view.
Figure 4:
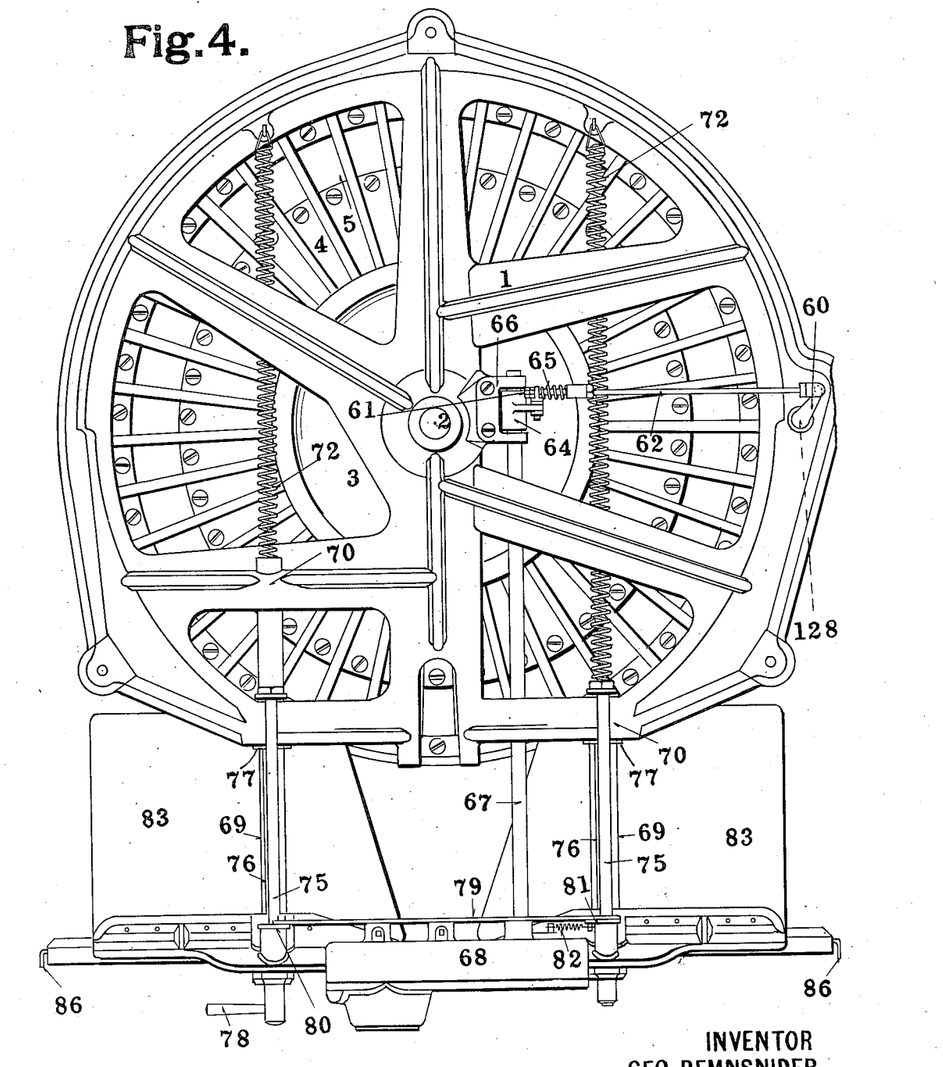
Figure 4 is a bottom plan view.

To return the lever 26 and handle 45 to normal position after the handle has been depressed to operate the punch, I pivot to the said lever 26 at 51 a rod 52 surrounded by a coil spring 53 and telescoping with a sleeve 54 pivoted at 55 to the cover plate 23. When the lever is depressed, the spring 23 will be compressed and upon release of the handle the expansion of the spring 23 will return the parts to normal position. The lower end of the shaft 39 is provided with an arm 125 connected by a link 126 with an arm 127 on a vertical shaft 128 journaled in the base 1. The lower end of the shaft 128 is provided with an arm 60 pivoted to a connecting rod 62 (Figure 4). This rod 62 is connected to an arm 63 carried by a sleeve 64, the connection preferably being made through a coil spring 65. 61 are lock nuts by means of which the tension of the spring 65 may be regulated. The sleeve 64 is provided with a key 71 engaging with a keyway in the shaft 67 and said sleeve is prevented from longitudinal movement by means of a bracket 66 carried on the base 1. Thus the said shaft 67 may move longitudinally through the sleeve but is incapable of rotation relative thereto. The front end of the shaft 67 is journaled in a casing 68 carried upon a pair of guides 69 sliding in guide ways 70 formed in the base 1. The guides 69 are hollow and each has situated in it a coil spring 72, the ends of which are attached to the base as best shown in Figure 4 so as to draw the casting 68 towards the machine. A stripping device 59 (best shown in dotted lines in Figure 3) is secured at 73 to the enlarged portion 22 of the casting 19 and at 84 to the base 1.

Figures 1, 16:
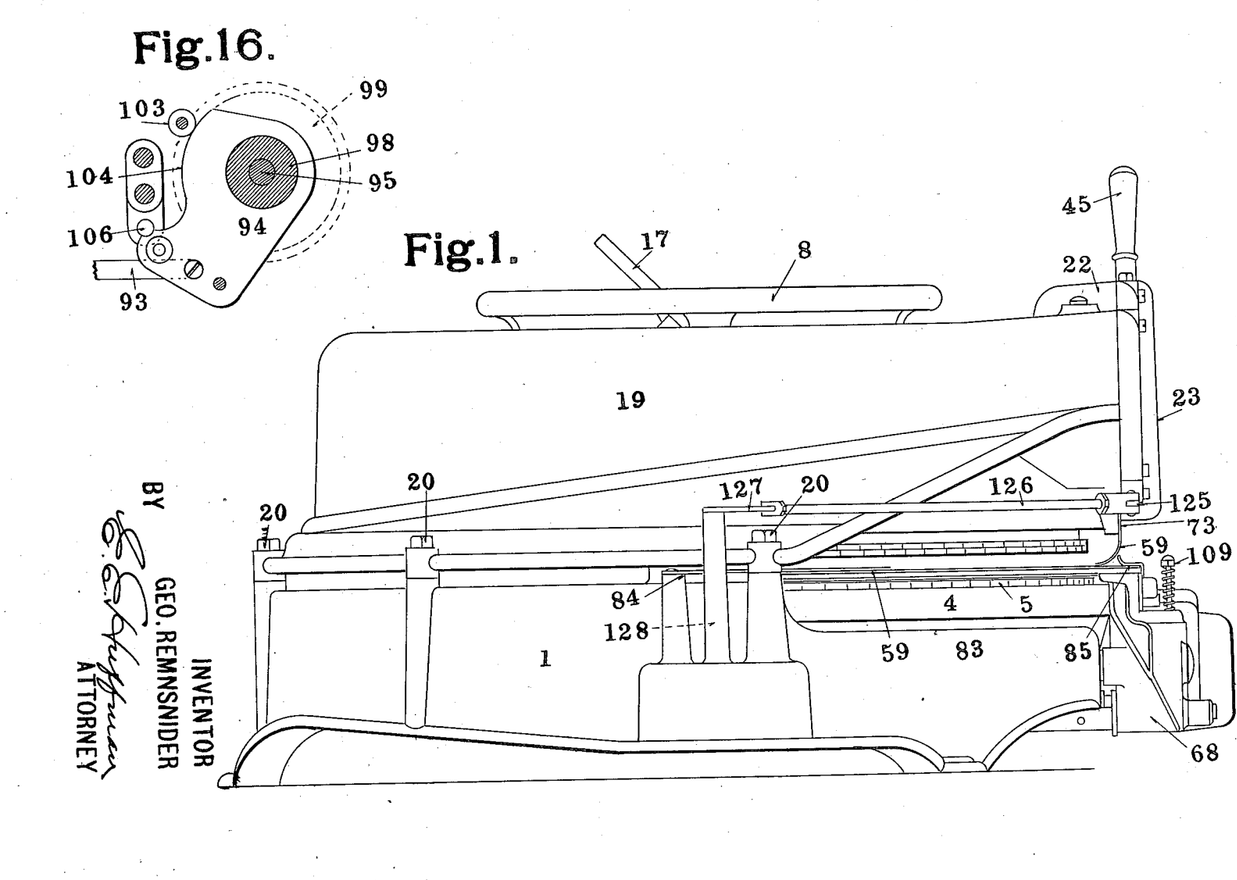
Figure 1 is a side elevation.
Figure 15 is a detailed view of the means for releasing the feed table and Figure 16 is a detailed view of some of the parts shown in Figure 5.
Figure 2:
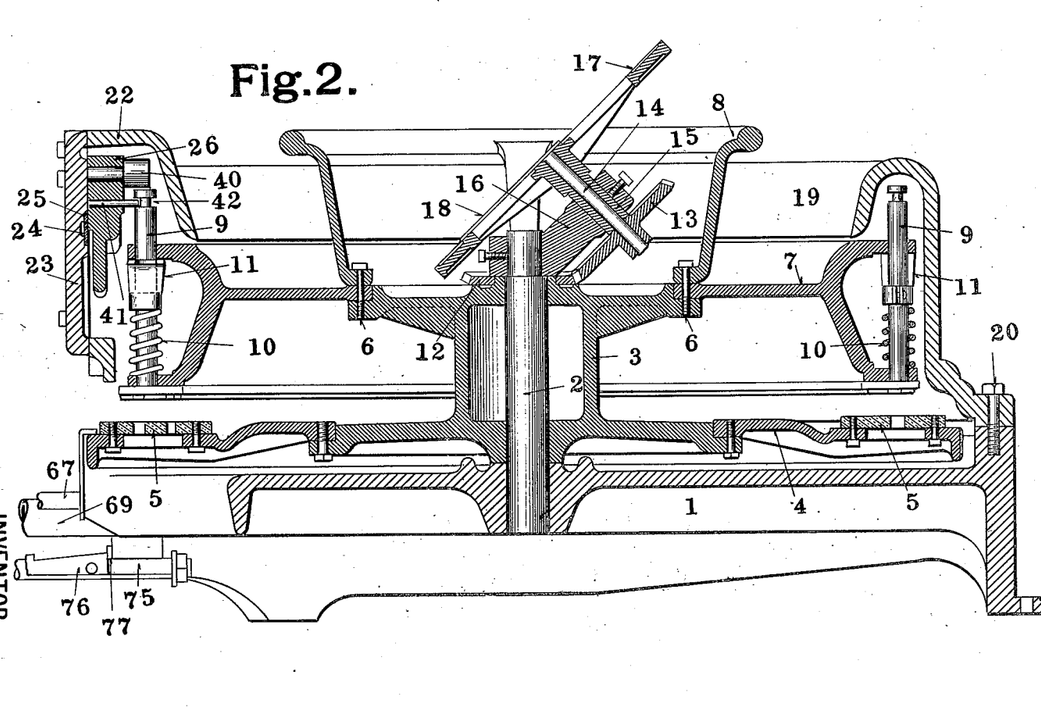
Figure 2 is a central section taken on the line 2—2 of Figure 3.
Figures 8, 9, 10:
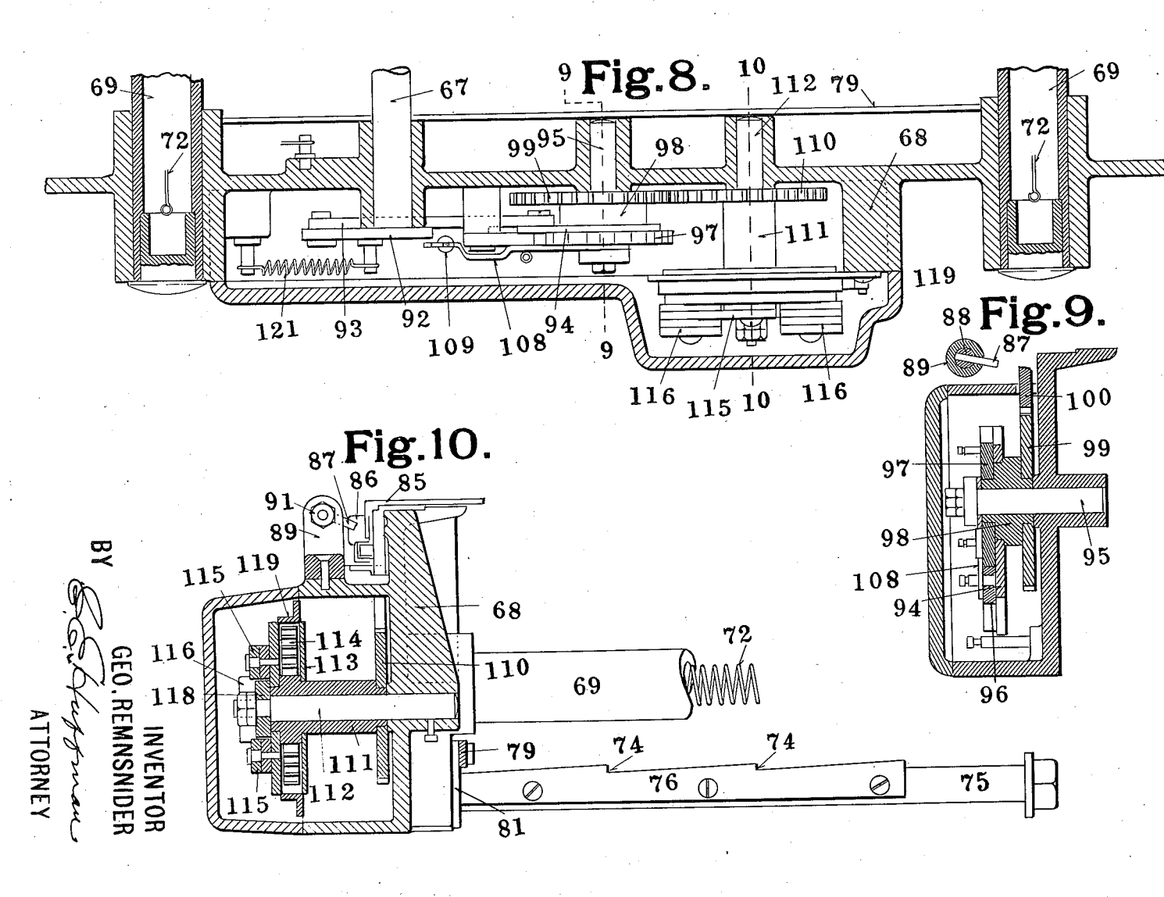
Figure 8 is an enlarged horizontal section through the feed carriage.
Figure 9 is a section taken on the line 9—9 of Figure 8.
Figure 10 is a section taken on the line 10—10 of Figure 8.

Arranged below the guides 69 are a pair of rock shafts 75 each of which carries a bar 76 the upper edge of which is provided with teeth 74 as best shown in Figure 10. The tension of the springs 72 hold the bars 76 against stops 77 carried by the base 1 as best shown in Figures 2 and 4. One of the shafts 75 is provided with a handle 78 (Figures 3, 4, and 15) by means of which the shaft can be rotated to disengage the bar 76 from its stop 77. The two shafts 75 are operated in unison by means of a link 79 pivoted to plates 80 and 81 on the shafts 75 and the parts are returned to their normal position by a spring 82 attached to one end to the plate 81 and at the other to the base of the machine.

The casting 68 serves as a support for the laterally moving sheet gripping mechanism 85, which is not described in detail in the present application as it is fully shown and described in Patent No. 1,374,234 granted to me April 12, 1921. The sheet gripping mechanism 85 is adapted to carry the stencil sheet laterally in the usual table 83. I, therefore, term it the carriage. The ends of this carriage 85 are provided with projections 86 as shown in Figures 3 and 4 which projections are adapted to strike against a pin 87 carried on a plunger 88 as shown in Figure 12. The said plunger 88 being arranged in a member 89 secured to the top of the casing 68 and coil spring 90 surrounds the stem of the plunger 88 thus provides a cushion for the carriage when it is returned by spring action as will hereinafter be described. 91 are lock nuts by means of which the tension of the spring 90 may be varied.

The front end of the shaft 67 is provided with an arm 92 connected by a link 93 with a plate 94 loosely mounted on a sleeve 98 which is loosely mounted on a stud 95. This plate 94 carries a feed pawl 96 adapted to engage with a ratchet wheel 97 rigidly secured to the sleeve 98. The sleeve 98 also rigidly carries a gear wheel 99 meshing with a rack 100 on the stencil sheet carriage 85. When the handle 45 is depressed the rock shaft 67 is operated, through the connection heretofore described, to move the link 93 toward the right hand side of the machine. The pawl 96 being in engagement with the ratchet wheel 97 causes said wheel to move in unison with the plate 94. As the ratchet wheel 97 and gear wheel 99 are both rigidly mounted on the sleeve 98 the wheel 99 acts on the rack 100 to feed the carriage forward a full space (corresponding to two teeth of the ratchet wheel) when the handle makes a full stroke, or a half space (corresponding to one tooth of the ratchet wheel) when the stroke of the handle is limited by moving the finger piece 50 into the path of the stop member 48. When the parts return to normal position a pawl 101 carried on the casing 68 prevents the return of the ratchet wheel 97 and attached parts. Overrotation is prevented by a pawl 102 provided on its rear face with a cylindrical projection 103 which normally rides on a cam face 104 on the plate 94 so that the said pawl is held out of engagement with the ratchet wheel until the plate 94 reaches the end of its swing. The pawls 101 and 102 are connected by a coil spring 105. The return movement of the plate 94 is limited by a stop pin 106. The pawls 96 and 101 are all provided with a cylindrical projection 107 which projections are adapted to be engaged by arm of a cam plate 108 loosely mounted on the stud 95. The cam plate 108 may be actuated by a spring raised finger piece 109 to throw back the pawls 96 and 101 out of engagement with the ratchet wheel 97 so that the feed carriage may be returned to its initial position by the spring mechanism now to be described.

Meshing with the wheel 99 is a wheel 110 mounted on a sleeve 111 on a stud 112. This sleeve 111 carries a drum 113 in which is situated the spring 114 for returning the carriage to its starting position. Attached to the outer face of the drum 113 are a pair of arms 115 carrying weights 116 at their outer ends and at their inner ends provided with brake shoes 117 adapted to bear on the brake drum 118 so as to automatically limit the return speed of the carriage. The drum 113 and spring 114 is surrounded by a housing ring 119. The pawl 96 is provided with a spring 120 and the arm 92 with a spring 121.

Figure 5:
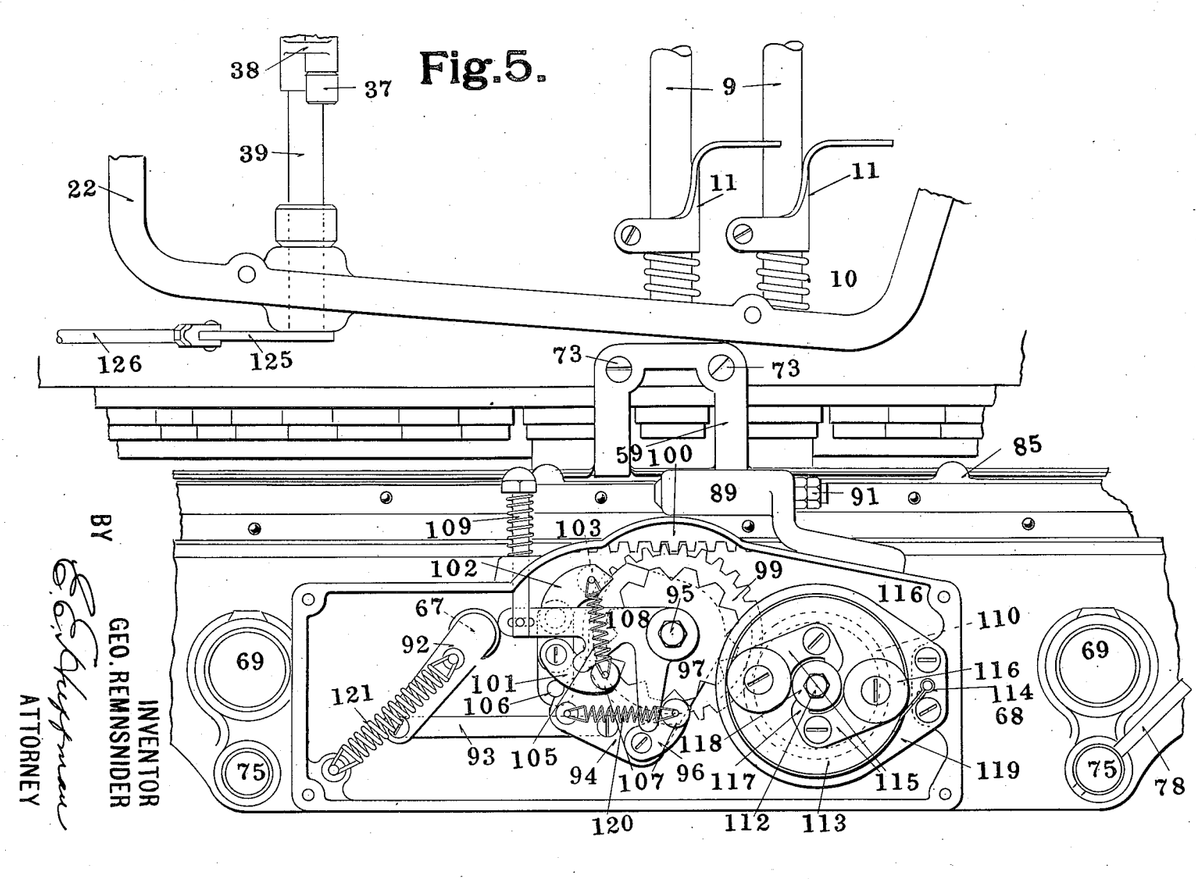
Figure 5 is an enlarged front view of a portion of the machine, the cover plates being omitted.

The operation of my device is briefly as follows: The sheet in which the stencil is to be cut is secured in the fastening means 85 and the casing 68 drawn forward until the ends of the bars 76 engage with the stop 77. The feed carriage is moved to its extreme right hand position by depressing the handle 78. This brings the sheet into position to cut the first character. The character is determined by rotating the hand wheel 8 until the pointer 18 indicates the proper character on the dial 17. The handle 45 is now depressed without actuating the finger piece 50 so that the handle will make a complete stroke to bring the lower stop 58 against its corresponding set screw 56. As the handle moves it swings the lever 26 on its pivot 27. The cam slot 28 in the said lever 26 acting upon the roller 29 moves the slide bar 25 towards the left hand side of the machine. This causes the cam 30 to actuate the lever 32 by contacting with the rolls 31 thereon so as to move the roll 35 between two of the punch stems and thus accurately position the punches and dies. The movement of the bar 25 also actuates the rock shaft 39, the movement being communicated through the arm 125, rod 126, arm 127, shaft 128 and arm 60 to the rod 62. This rod through mechanism shown in detail in Figures 13 and 14 actuates the feed shaft 67. The actuation of the feed shaft 67 causes the plate 94 to be swung on its pivot so as to actuate ratchet wheel 97 and thus operate the carriage 85 and then feed the sheet one space toward the left. At the same time the downward movement of the lever 26 causes the projection 40 to engage with the top of the end of the punches 9 and force the punch down through the stencil sheet into the die. The punch, however, does not engage with the stencil sheet until after the feeding operation is completed. In case it is desired to form a space between the latter, the finger piece 50 is actuated when the handle is depressed so as to arrest the handle about the mid-way of its motion so as to feed the carriage only one half space and not to depress the punch sufficiently to bring it into engagement with the stencil sheet. When the carriage is released by the depression of the finger piece 109 so that the spring 113 returns the carriage to normal position, the automatic governing mechanism shown in Figures 5, 8, and 10 operates to limit the speed of the return of the carriage so as to prevent injury to the machine. This result is also assisted by means of the spring stop 89.

Having fully described my invention what I claim as new and desire to secure by Letters Patent of the United States is:

1. In a device of the class described, the combination with a rotary punch and die carrying member, of a pivotally mounted member for operating the punches, a handle for actuating said member, a sliding bar, means for moving said bar longitudinally from said member and locking means for the punch and die carrying member actuated from said bar.

2. In a device of the class described, the combination with a rotary punch and die carrying member, of a pivotally mounted member for operating the punch, a handle for actuating said member, a sliding bar, means for moving said bar longitudinally from said member, a locking device for the punch and die carrying member and a double ended cam carried by said bar for actuating said locking member.

3. In a device of the class described, the combination with a rotary punch and die carrying member, of a pivotally mounted member for operating the punch, a handle for actuating said member, a sliding bar, said pivotal member being provided with a cam for moving said bar longitudinally, and locking means for the punch and die carrying member actuated from said bar.

4. In a device of the class described, the combination with a rotary punch and die carrying member, of a pivotally mounted member for operating the punches, a handle for actuating said member, a sliding bar, means for moving said bar longitudinally from said member, a locking device provided with a pair of anti-friction rolls, a cam on said sliding bar for engaging said rolls to actuate the locking member.

5. In a device of the class described, the combination with a rotary punch and die carrying member, of a pivotally mounted member, a sliding bar, means for moving said bar longitudinally from said member, a locking device provided with a pair of anti-friction rolls, a cam on said sliding bar for engaging said rolls to actuate the locking member, and an anti-friction roll carried by said member and engaging with the punch stems.

6. In a device of the class described, the combination with a rotary punch and die carrying member, of a pivotally mounted member for operating the punches, a handle for actuating said member, a sliding bar, means for moving said bar longitudinally from said member, locking means for said punch, a die carrying member actuated from said bar, and a sheet feeding mechanism also actuated by said bar.

7. In a device of the class described, the combination with a rotary punch and die carrying member, of a casing for said member, a cover plate for the casing provided with a guide way, a lever pivoted in said casing, a sliding member secured in said guide way and arranged between said lever and cover plate, an operating handle, and a link connection between said handle and lever.

8. In a device of the class described, the combination with a rotary punch and die carrying member, of a casing for said member, a cover plate for the casing provided with a guide rail, a lever pivoted in said casing, a sliding member secured in said guide way and being arranged between said lever and cover plate, an operating handle, and a link connection between said handle and lever.

9. In a device of the class described, the combination with a rotary punch and die carrying member, of a casing for said member, a cover plate for said casing, a lever pivoted to said cover plate, means for operating the punches from said lever, a sliding bar situated between said lever and plate, locking means for the punch and die carrying member actuated from said bar, a handle pivoted to the casing and a link connecting said handle and lever.

10. In a device of the class described, the combination with a rotary punch and die carrying member, of a casing for said member, a cover plate for said casing, a lever pivoted to said plate, means for operating the punches from said lever, a sliding bar situated between said lever and plate, locking means for the punch and die carrying member operated from said bar, a handle pivoted to the casing and a link connection between said handle and lever.

11. In a device of the class described, the combination with a rotary punch and die carrying member, of a casing for said member, a cover plate for said casing, a lever pivoted to said cover plate, an operating handle for said lever situated between said casing and cover plate, said casing and cover plate being provided adjacent to the pivot point of said handle with guide fasteners for said lever, a link connection between said lever and handle, and means carried by said lever for actuating the punches.

12. In a device of the class described, the combination with a rotary punch and die carrying member, of actuating means for the punches, a sheet carrying table movable toward and away from said punch and die carrying member, a longitudinally slidably operating shaft carried by said table and feeding mechanism for moving the table longitudinally, said feeding mechanism lying in a plane perpendicular to the operating shaft.

13. In a device of the class described, the combination with a rotary punch and die carrying member, of actuating means for the punches, a sheet carrying table movable toward and away from said punch and die carrying member, a longitudinally slidably operating shaft carried by said table feeding mechanism for moving the table longitudinally, governing mechanism for automatically limiting the return speed of said table, said table feeding mechanism being situated intermediate said governing mechanism and said longitudinally sliding shaft.

14. In a device of the class described, the combination with a rotary punch and die carrying member, of a sheet carrying table, feeding mechanism for said table including a longitudinally sliding shaft, of a feed wheel mounted on a stud parallel to said shaft, a second stud also parallel to said shaft, a sleeve mounted on said second stud and meshing with said gear wheel, an automatic governing mechanism mounted on said sleeve.

In testimony whereof, I have hereunto set my hand and affixed my seal.

GEO. REMNSNIDER. [L. S.]